Patented Oct. 21, 1952

2,615,049

UNITED STATES PATENT OFFICE 2,615,049

PROCESS FOR PRODUCING CHLORAL

John A. Pianfetti and David J. Porter, South Charleston, W. Va., assignors to Food Machinery and Chemical Corporation, Wilmington, Del., a corporation of Delaware No Drawing. Application May 3, 1947, Serial No. 745,726

4 Claims. (Cl. 260—601)

1

This invention relates to the production of chloral from acetaldehyde and its reversible polymers, such as paraldehyde.

Chloral, which is known as a valuable intermediate in organic syntheses and as a pharmaceutical agent, has come into particular prominence in recent years as an intermediate in the production of a compound known as DDT; namely, 2,2-bis-(4-chlorophenyl)-1,1,1-trichloroethane. Due to the prominence of DDT both as an insecticide and as a means for controlling disease through the control of disease-carrying insects, research in the production of this product and the intermediates used therein has been intensive over a number of years. Yet chloral has been produced commercially from alcohol, even though a very modest yield, say, not exceeding about 35 per cent based on the amount of alcohol used, has been obtainable.

It is also known from the prior art that chloral is one of the products obtained from acetaldehyde when it is subjected to chlorination. Nevertheless, the production of chloral from acetaldehyde on a commercial scale has never been undertaken to our knowledge except as explained in John A. Pianfetti et al. copending application, Serial No. 610,210, filed August 10, 1945, involving initial chlorination at temperatures below 50° C. and preferably below 30° C. The failure to use acetaldehyde or its reversible polymers as a raw material for the production of chloral probably is due to the fact that yields by known chlorination techniques have neither been commercially acceptable nor so satisfactory as those obtained by the chlorination of alcohol. In general, in the prior art techniques the yield of chloral was too low to be commercially interesting. Apart from the unreacted aldehyde, numerous by-products which could not be converted into chloral, such as the acetyl chloride and acetic acid, or condensation products, such as butyl chloral, were produced in substantial quantities. The presence of these undesired by-products not only reduced the yield of the desired product but also introduced problems of separation.

In the production of any chemical on a commercial basis, it is always necessary, especially where the raw materials are relatively expensive, to obtain yields which are sufficiently high to preclude the process from being prohibitively expensive. It is also important to minimize the production of undesirable by-products, especially those which are difficult to separate. Additionally, it is necessary to complete the cycle of production in a reasonable period of time in order that the apparatus may be efficiently used.

Now, in accordance with our invention, we have discovered that chloral can be produced from acetaldehyde and its reversible polymers which depolymerize under chlorination in commercially interesting yields in a relatively short period of time by chlorinating the aldehyde with sufficient chlorine to convert the available aldehyde into chloral without the necessity of controlling the initial chlorination temperatures and advantageously at initial chlorinating temperatures of 50° C. or more. A major proportion of the acetaldehyde or its reversible polymer is readily converted into chloral, and yields equaling or exceeding 75 per cent are frequently obtained. These results are obtained by using a liquid diluent which is compatible, or preferably miscible, with the aldehyde and its chlorination products. The amount of diluent used varies with the diluent and with the temperature, but customarily at least 1 mol of diluent should be present for every mol equivalent of acetaldehyde introduced.

Theoretically, at least 3 mols of chlorine per mol equivalent of acetaldehyde is required in the instant process. However, due to the fact part of the acetaldehyde or its reversible polymers is converted into undesirable by-products utilizing less than 3 mols of chlorine and certain amounts of aldehyde are lost in the chlorination, it is difficult to specify a particular amount of chlorine to produce a satisfactory yield. Normally more than 2 mols of chlorine per mol equivalent of acetaldehyde is required, and in most operations at least 2.5 mols of chlorine is required per mol equivalent of acetaldehyde.

The preferred diluent used in our process is the chlorination product of the acetaldehyde or its reversible polymer. In using such diluents, problems of refining the crude product and separating undesired products are significantly reduced. When using chlorinated aldehydes as the diluent and introducing the chlorine and aldehyde in a ratio sufficient to convert the aldehyde to chloroacetaldehyde, the concentration of the aldehyde present in the reaction mass is always maintained as low as found necessary or desirable, and conditions found conducive to the formation of the desired chlorination products are maintained and the formation of undesired by-products seemingly inhibited. Other liquid diluents which are miscible with the aldehyde or its chlorination product may be used, however, such as acetic acid, organic solvents such as carbon tetrachloride, inorganic materials such as water, and the like. When diluents other than the products of the chlorination are used, it is often difficult to separate them from the reaction mass, particularly when water is used; and, as a result, anhydrous diluents are preferred, such as certain organic liquids.

The reaction may be initiated at room temperatures and the temperatures permitted to rise as a result of the exothermic heat of chlorination. Where it is desired to lessen the chlorination cycle, however, chlorination is initiated at temperatures of at least 50° C. or even at 70° C. and more.

In order to obtain high yields of chloral, it is necessary to use reaction-promoting substances or other reaction-promoting techniques at least in the latter phase of the process. The preferred reaction-promoting substances are metal chlorides, such as those of iron, zinc, antimony, tin, and chlorides of phosphorus or mixtures thereof. Antimony trichloride has proved to be especially advantageous. Generally speaking, not more than 10 per cent of the chlorides as compared to the weight of acetaldehyde can be used economically in the process. By using such reaction-promoters, yields of the order previously mentioned can be obtained without operating at temperatures in excess of the boiling point of the diluents used or that of the reaction mass.

Water offers a cheap reaction-promoting substance and may simultaneously serve as a compatible diluent but is not preferred for either purpose, since its presence apparently favors the formation of undesirable by-products and necessitates a more involved procedure for the purification of the chloral than would otherwise be necessary. When water is used, it is customarily used in molar proportions of 1 to 3 mols per mol of acetaldehyde or its equivalent, although larger proportions may be used.

Among the other reaction-promoting techniques is chlorination at temperatures above the normal boiling point of the reaction mass.

The present process is advantageously operated by having chlorine, acetaldehyde, or its reversible polymer, and a reaction-promoting agent introduced continuously into the system and the reaction product continuously withdrawn therefrom. In such a continuous system a single reactor may be used, but it is preferable to use at least two reactors with part of the chlorine necessary to convert the aldehyde to chloral being introduced into each of the reactors. The reaction-promoting agent may be introduced into either or both of the reactors. More than two reactors may be used but generally are not necessary. When using the plurality of reactors, substantially all of the dichloroacetaldehyde, which is difficult to separate from the chloral, may be converted to chloral, the amount remaining being reduced to 1 per cent or less of the original aldehyde.

The process can be operated with a batch or intermittent, rather than continuous, addition of the aldehyde. The preferred procedure for this mode of operation involves adding the aldehyde to a relatively large volume of the chlorination product, chlorinating until the desired chlorination product is reached, withdrawing enough material to reduce the content of the reactor to the same volume as that present before the addition of aldehyde, and then repeating the cycle. This intermittent technique is a type of continuous operation. In the batch process the aldehyde and the desired amount of diluent are introduced into the chlorinator, and chlorine is then introduced until the desired degree of chlorination is obtained. The reaction-promoting material may be introduced into the batch or simultaneously with the chlorine.

In practicing our invention by the batch process, we have discovered that violent explosions may occur as a result of explosive mixtures forming in the gas space in our reaction chamber. In general we have found that such mixtures are explosive when about 30 to 95 per cent of chlorine is present per 70 to 5 per cent of acetaldehyde. Such explosions would not occur in the absence of an activating agent such as light or a spark, but it is practically impossible to preclude the possibility of such activators being present. Thus in view of the fact that the amount of acetaldehyde present in the atmosphere in the reaction chamber is a function of the reaction conditions and in view of the further fact that the reaction conditions are rather specifically controlled as explained hereinbefore, we have found it best to preclude the possibilities of explosions taking place by controlling the amount of chlorine present in the atmosphere of the reaction chamber. This can be done by regulating the rate at which the chlorine is introduced. In a preferred practice, we regulate the introduction of chlorine into the reaction chamber such that the amount of chlorine in the atmosphere of the reaction chamber does not exceed 30 per cent thereof and advantageously does not exceed about 10 to 15 per cent thereof in order to maintain a margin of safety.

We have also found that a nonexplosive atmosphere may be maintained in our reaction chamber by the introduction of an inert gas such as hydrogen chloride, nitrogen, or preferably carbon dioxide. As the chlorination progresses, enough hydrogen chloride is evolved to maintain nonexplosive mixtures in the atmosphere of the reactor, but in the early stages the introduction of hydrogen chloride is relatively disadvantageous, for it is absorbed in substantial amounts by the liquids in the reactor.

Nonexplosive atmospheres may be maintained by introducing the carbon dioxide at a rate such that at least 52 per cent of the atmosphere in the reaction chamber is carbon dioxide. Customarily, in the operation of our process, the reactor is purged with the carbon dioxide prior to the introduction of acetaldehyde or its reversible polymer, and the carbon dioxide is continuously introduced during the reaction at a rate such that nonexplosive mixtures are maintained in the atmosphere of the reactor. It is also the custom to regulate the flow of chlorine so that an insufficient amount of chlorine is present to cause an explosion. By operating in this manner, our process has been freed from any possibility of an explosion hazard.

We have observed in the practice of our invention that the danger of explosion diminishes as the acetaldehyde or its polymer is chlorinated. In general, the possibility of explosion is substantially eliminated after 1.3 mols of chlorine has been absorbed per mol of acetaldehyde or equivalent of its reversible polymer. In order to have a margin of safety, however, the introduction of the inert gas is continued and the rate of chlorine introduced is controlled until 1.5 mols of chlorine has been absorbed.

If the instant process is carried out continuously, there is not much danger of explosions except possibly when starting up the chlorination, since, after a steady state is reached, hydrogen chloride is evolved continuously and dilutes the chlorine-aldehyde vapors to such an extent that they are not explosive. In a special embodiment involving continuous chlorination at about 85° C. in a body of liquid consisting principally of chloral, there is no danger of explosions even when initiating the process, since the vapor pressure of chloral is so high as to preclude the possibility of an explosive mixture of chlorine and aldehyde vapors. Likewise, where the diluent is the chlorination product of acetaldehyde or its reversible polymer, especially chlorination products containing a substantial amount of chloral, explosive mixtures are not formed. The absence of explosive conditions when operating in accordance with preferred procedures described herein constitutes a special feature of this invention.

In the operation of our process, paraldehyde is preferably used, although kindred yields can be obtained from acetaldehyde. Acetaldehyde is more difficult to handle, and the reaction is more difficult to control.

In a typical operation two connected reactors provided with agitators, vent valves, and so forth are used. The desired amount of chlorinated acetaldehyde to be used as a diluent is introduced into the first reactor. Each of the reactors is maintained at a temperature of approximately 85° C. The aldehyde and about 2.3 per cent of the weight thereof of antimony trichloride are introduced continuously into the first reactor. Simultaneously, the desired amount of chlorine is introduced into the two reactors, the larger portion being introduced into the first reactor. Hydrogen chloride is evolved from each of the reactors. The rate of flow of the chlorinated material from the first reactor to the second reactor is determined by the rate of introduction of the various ingredients. The average retention time of the liquid in each chlorinator is adjusted to approximately one hundred forty hours. The crude chloral leaving the second chlorinator is purified by vacuum rectification. By proceeding in this manner, chloral approximating 75 per cent of the theoretical yield is obtained, while less than 1 per cent of the original aldehyde remains as dichloroacetaldehyde.

The following examples further illustrate the operation of the process.

*Example 1*

Chlorine and paraldehyde are fed continuously into a reactor maintained at 70° C. The mol ratio of chlorine to paraldehyde is 4.5 to 1, or one-half the amount theoretically necessary to convert the aldehyde to chloral. The feed rate is such that the average retention time in the chlorinator is twelve hours. The initial reaction product consists principally of mono- and dichloroacetaldehyde. As the chlorinated aldehyde is formed, it serves as a diluent for the paraldehyde being introduced. Antimony trichloride is added to this product at the rate of 7 grams per 100 grams of original aldehyde. The chlorination is then completed batchwise at an average temperature of about 80° C. In the final product 72.5 per cent of the original aldehyde is present as chloral and 2.3 per cent as dichloroacetaldehyde.

The amount of dichloroacetaldehyde can be reduced to 1 per cent or less of the original aldehyde by using a longer period of reaction.

The chloral may be separated from the crude reaction product by vacuum rectification, at, say, about 100 millimeters of mercury absolute pressure. In such separatory procedures the chloral, containing certain low-boiling by-products, constitutes the overhead product, while the antimony trichloride and high-boiling impurities remain in the still and are removed from the base thereof. A second rectification may be used to remove the low-boiling impurities, but in certain uses of the product this is unnecessary.

*Example 2*

Chlorine and paraldehyde are fed in a mol ratio of about 9 to 1 into a chlorination vessel initially filled with chloral and maintained at a temperature of 85° C. Antimony trichloride at the rate of 2.3 grams per 100 grams of paraldehyde is also added. The product is withdrawn continuously to maintain a constant volume in the reactor. The feed rates are such that the average time of retention of the material in the chlorinator is 273 hours. The chloral and dichloroacetaldehyde in the product under certain circumstances represent 59 per cent and 4 per cent, respectively, of the original aldehyde. When such yields are obtained, only 2 per cent of the paraldehyde is converted to butyl chloral and approximately 3 per cent to acetic acid.

By more careful controls and regulation of the period of retention, the procedures of this example may be used to produce typical yields of 75 per cent of chloral and 1 per cent of dichloroacetaldehyde.

*Example 3*

Upon repeating the chlorination described in Example 2 with a retention time of sixty-eight hours, the chloral and dichloroacetaldehyde in the reaction product typically represent 70 per cent and 6 per cent, respectively, of the original paraldehyde, although yields as low as 59 per cent and 15 per cent, respectively, are at times obtained.

*Example 4*

The operations described in Example 2 were repeated with a second chlorinator in series with the first. The chlorine feed was divided between the two, the greater part going to the first chlorinator. The retention time in each chlorinator was sixty-eight hours. The chloral and dichloroacetaldehyde in the product represent 78 per cent and 0.6 per cent, respectively, of the original paraldehyde.

In the illustrative embodiments of the examples where the aldehyde is converted into chloroacetaldehyde in one reactor and the chlorinated acetaldehyde more highly chlorinated in a succeeding reactor, the first phase of the chlorination could be eliminated by procuring chloroacetaldehydes from other sources, such as monochloroacetaldehyde produced from vinyl chloride and hypochlorous acid. When the second phase above is used, diluents are unnecessary, since the chloroacetaldehydes apparently undergo undesired side reactions, such as oxidation to acetic acid or condensation reactions, much less readily than the unchlorinated aldehyde.

It will be understood that acetaldehyde and its reversible polymers encompass monomeric acetaldehyde having the formula $CH_3CHO$ and those polymers having the formula $(CH_3CHO)_n$ which may be made reversibly from it, such as paraldehyde, metaldehyde, and the like. When metaldehyde is used in the process, it is preferably used in a liquid medium.

The foregoing description constituting illustrative embodiments of the invention is not to be considered a limitation upon the invention, for the invention contemplates various adaptations, alterations, and modifications within the scope of the invention which is defined by the appended claims.

We claim:

1. A process for producing chloral from a substance selected from the group consisting of acetaldehyde and its reversible polymers comprising mixing said substance with an amount of a liquid diluent substantially free of organic substances reactive with said substance and its chlorination products sufficient to substantially prevent deleterious side reactions at the temperatures employed and with antimony trichloride, and chlorinating said substance at a temperature of at least 50° C. substantially throughout the chlorination until a major portion is converted to chloral.

2. A process for producing chloral from a substance selected from the group consisting of acetaldehyde and its reversible polymers comprising mixing said substance with an amount of the chlorination products thereof sufficient to substantially prevent deleterious side reactions at the temperatures employed and with antimony trichloride as a reaction-promoter, and chlorinating said substance at a temperature of at least 50° C. substantially throughout the chlorination until a major portion is converted to chloral.

3. A process for producing chloral comprising mixing chlorine with an incompletely chlorinated acetaldehyde and antimony trichloride as a reaction-promoter, and chlorinating said chlorinated aldehyde at temperatures in excess of 50° C. substantially throughout the chlorination until a major portion thereof is converted to chloral.

4. A process for producing chloral from a substance selected from the group consisting of acetaldehyde and its reversible polymers comprising mixing said substance with an amount of an inert anhydrous organic diluent sufficient to substantially prevent deleterious side reactions at the temperatures employed and with antimony trichloride as a reaction-promoter, and chlorinating said substance at a temperature of at least 50° C. substantially throughout the chlorination until a major portion is converted to chloral.

JOHN A. PIANFETTI.
DAVID J. PORTER.

REFERENCES CITED

The following references are of record in the file of this patent:

UNITED STATES PATENTS

| Number | Name | Date |
|---|---|---|
| 2,443,183 | Cass | June 15, 1948 |
| 2,478,741 | Brothman | Aug. 9, 1949 |

FOREIGN PATENTS

| Number | Country | Date |
|---|---|---|
| 612,396 | France | July 31, 1926 |

OTHER REFERENCES

Pinner, "Liebig's Annalen," vol. 179–180, pages 24, 25 (1875).

Groggins, "Unit Processes in Organic Synthesis," 1st ed., 1935, pages 192–194.

Thorpe, "Dictionary of Applied Chemistry," 4th ed., 1937, vol. 1, page 33.

Callaham, Chem. and Met., vol. 51, Oct. 1944, pages 109–114.